Figure 1:
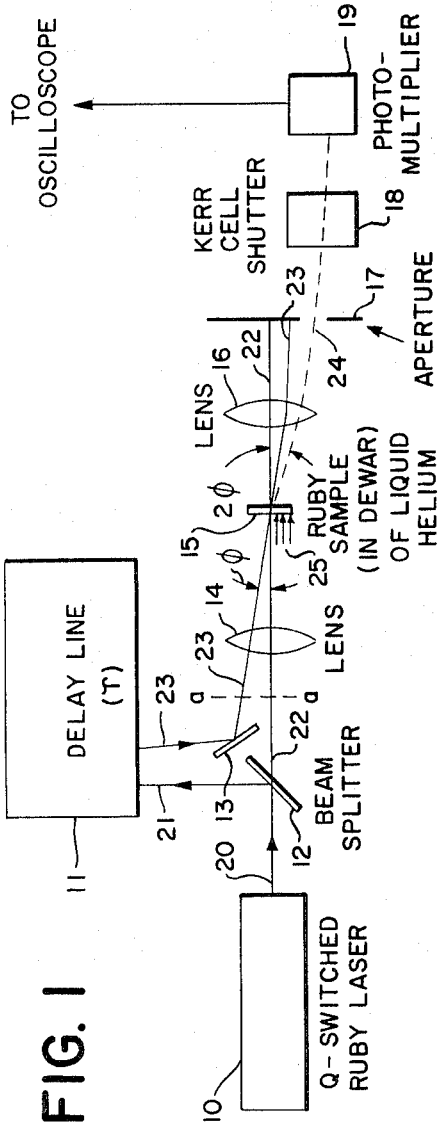

United States Patent
Hartmann et al.

[15] 3,638,029
[45] Jan. 25, 1972

[54] METHOD AND APPARATUS FOR GENERATING PHOTON ECHO PULSES

[72] Inventors: Sven R. Hartmann, Dobbs Ferry, N.Y.; Norman A. Kurnit, Boston, Mass.; Isaac D. Abella, Chicago, Ill.

[73] Assignee: Albert C. Nolte, Jr., Borough of Manhattan New York, N.Y.

[22] Filed: July 7, 1969
[21] Appl. No.: 843,281

Related U.S. Application Data

[63] Continuation-in-part of Ser. No. 456,240, May 17, 1965, abandoned.

[52] U.S. Cl..............................250/225, 250/84, 340/173 L
[51] Int. Cl..........................................................F21k 7/00
[58] Field of Search .........................250/42, 84, 219, 225; 331/94.5; 340/173 L

[56] References Cited

UNITED STATES PATENTS 3,199,049 8/1965 Morse et al.............................331/94.5
3,353,115 11/1967 Mainman...............................331/94.5

Primary Examiner—Ronald L. Wibert
Assistant Examiner—Edward S. Bauer
Attorney—Nolte and Nolte

[57] ABSTRACT

A material which is capable of absorbing and storing the energy of illuminating pulses is illuminated by a first high-intensity light pulse, and is subsequently illuminated by a second high-intensity pulse. When the homogeneous relaxation process of the material is sufficiently long as compared to the time separation of the pulse, a photon echo pulse is emitted from the material at a time following the second pulse substantially equal to the time separation of the first and second pulses. In a modification of the invention, the first and second pulses are angularly displaced, and the photon echo pulse is thereby emitted at an angle of twice the displacement from the first pulse.

13 Claims, 2 Drawing Figures

INVENTORS
SVEN R. HARTMANN et al

BY *Nolte & Nolte*

ATTORNEYS

METHOD AND APPARATUS FOR GENERATING PHOTON ECHO PULSES

This application is a continuation-in-part of application Ser. No. 456,240, filed May 17, 1965, now abandoned.

This invention relates to a method and apparatus for producing photon echoes from a material, such as a crystal, liquid, gas or semiconductor, which is capable of absorbing and storing the energy of illuminating pulses. More particularly, the invention relates to a method for producing photon echoes from a body of such material illuminated by intense light pulses generated by a laser. While examples given in the following paragraphs relate only to the use of a material such as a ruby crystal, this material was selected in view of the current availability of a substantial amount of information and equipment for working with this material. The invention is, not, however, limited to the use of this material, and the criteria for selecting other materials and the necessary conditions of their operation will be discussed in the following paragraphs.

It has been observed that when a ruby sample is irradiated by two intense light beams emitted by a ruby laser, an additional pulse of light, called the photon echo, is emitted spontaneously from the ruby sample at a predetermined time after the second pulse strikes the ruby sample, said time being very nearly equal to the time separation between the illuminating pulses. The first intense light pulse illuminating the ruby sample creates a superradiant state within the ruby sample which quickly dephases due to inhomogenities in the sample. The radiation from the atoms in the sample after dephasing is the normal weak fluorescence from ruby. A second intense light beam, illuminating the ruby sample, reverses the dephasing and causes the atoms to rephase in a time equal to the time separation between the first- and second-illuminating pulses. The second-illuminating pulse thus causes the ruby sample to return eventually to its superradiant state which in turn causes an additional burst of radiation to be emitted from the ruby sample, herein called the photon echo.

The ruby sample also has the property that if the first and second intense light pulses illuminate the sample from two directions separated by a small angle $\phi$, the echo emitted from the ruby propagates in a forward direction at an angle approximately equal to $2\phi$ from the path of travel of the first pulse. The ruby sample is thus sensitive to the direction of the applied illuminating light pulses. This arrangement, as compared with the previously discussed arrangement in which the pulses are directed at the same angle, provides the additional advantage that the photon echo may be separated from the energizing pulses on the basis of their angular position. This phenomena also readily adapts the device for use in a logic system, since the angular displacement of the emitted light is a function of the angular displacement of the second pulse. Similarly it has also been found that if the two incoming illuminating pulses are plane-polarized at an angle of $\theta$ with respect to each other, the echo emitted is polarized at an angle of $2\theta$ with respect to the first pulse. Thus when the two-intense light pulses illuminating the ruby sample are separated in time by $\tau$, in direction by $\phi$, and in polarization by $\theta$, an echo is generated which is delayed in time from the first pulse by about $2\tau$, radiating at an angle of approximately $2\phi$, and contained in the plane of polarization of $2\theta$, with respect to the first pulse.

One possible application of this novel method of generating photon echoes can be in computer devices in which the echo generator is used as a memory element. The first-illuminating pulse may correspond to the information to be stored, the second pulse to the computer interrogation pulse, and the echo to the release of stored information. It is also conceivable and within the scope of this invention to store several pulses within the echo generator, each having a corresponding echo so as to increase the memory capability of the generator. Moreover, it has been observed for example that the echo pulse can itself produce additional echoes to be emitted from the sample. These techniques and observations are similar to those of the spin-echo phenomenon disclosed for example, in the articles "Spin-Echo Memory Device," Journal of Applied Physics, Volume 26, No. 1, pages 170–181, by Fernbach & Proctor, and "Spin-Echo Serial Storage Memory," Journal of Applied Physics Volume 26, No. 11, pages 1324–1338, by Anderson et al. The storage access times of this memory unit can, in principle, be as small as 0.1 nanosecond, a speed which provides an improvement in access times to present memory devices of over 1,000 times. This is made possible by the fact that light is employed in the memory unit so that the only limiting factor in communication to this type of memory device is the velocity of the light.

It is, therefore, an object of this invention to provide a method and apparatus for the generation of photon echoes from a medium irradiated with a plurality of intense light pulses.

It is another object of the present invention to provide a method and apparatus for the generation of a photon echo from an irradiated medium illuminated by two-intense light pulses wherein the direction of the emitted photon echo is responsive to the angular difference between the illuminating pulses.

It is another object of the present invention to provide a method and apparatus for the generation of echo pulses from an irradiated medium illuminated by two-successive light pulses wherein the echo pulse produced is delayed in time from the first of said light pulses by twice the time difference between said first and second pulses.

It is a further object according to the present invention to provide a method and apparatus for the generation of a photon echo pulse from an irradiated medium illuminated by a first and second high-intensity polarized light beam, wherein the angle of polarization of said photon echo with respect to said first light beam is twice the magnitude of the angular difference in polarization between said first- and second-illuminating light beams.

Other objects and features of the present invention will become apparent from the following detailed description considered in connection with the accompanying drawings, which disclose one embodiment of the present invention. It should be understood, however, that the drawings are designed for purposes of illustration only and not as a definition of the limits of the invention, as to which reference should be made to the appended claims.

Figure 2:
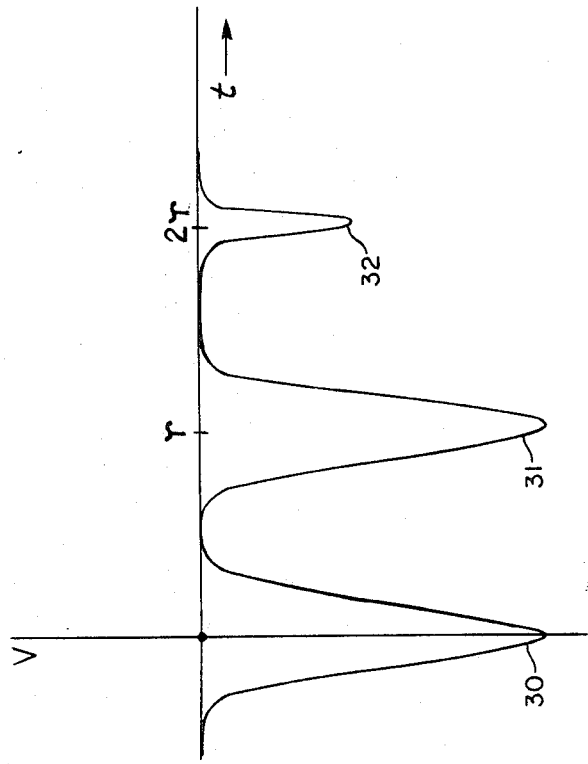

In the drawings:

FIG. 1 is a plan view of the method and apparatus embodying the principles of the present invention; and FIG. 2 is a typical response observed at the output of the apparatus of FIG. 1.

Referring to FIG. 1, a Q-switched ruby laser 10 is triggered to produce an intense narrow beam width light pulse 20 having a duration of, for example, approximately 10 nanoseconds. The narrow beam light pulse 20 is directed to beam splitter 12, which may consist of a partially silvered reflective surface, so that a portion 21 of the beam is reflected from the beam splitter and directed to a delay line 11, and the remaining portion 22 of the beam 20 is unreflected and is thus directed toward lens 14. The reflected beam 21, upon entering optical delay line 11, is delayed in time before emerging from the delay line as beam 23 and reflected off surface 13. Reflected beam 23 is delayed in time by an amount $\tau$ with respect to incident beam 22 crossing plane $a—a$. In the embodiment of the invention, reflective surface 13 is preferably arranged so that beams 22 and 23 are displaced by a small angle $\phi$ with respect to one another after passing through focusing lens 14. Lens 14 is adjusted so that both light pulses are focused on the same area of a ruby sample 15. Ruby sample 15 consists of a chromium doped synthetic ruby crystal (up to 0.5 percent Cr) having a thickness of approximately 1 mm. and may be immersed in a bath of liquid helium. A magnetic field 25 may also be applied to the ruby sample 15 along a direction substantially parallel to its optic axis. Cooling of the ruby sample to liquid helium or nitrogen temperatures is desirable so that the relaxation time of the ruby sample is not too short compared to the separation in time between the illuminating pulses, as will be discussed in more detail in the following paragraphs. Echoes can be observed at higher temperatures but the permissible values of $\tau$ are then correspondingly smaller. The incident and reflected light pulses emerging from the ruby sample 15 are focused by lens 16 against an aperture plate 17. Subsequent to the emergence of the reflected pulse 23 from ruby sample 15, an echo pulse 24 is emitted and directed toward lens 16 at an angle twice that of the angular separation between the incident and reflected light pulses illuminating the ruby sample 15. Because of its angular displacement with respect to the incident pulses, light echo 24 passes through lens 16 at a point near its periphery and is directed through an aperture in the plate 17 so that it strikes photomultiplier 19. A Kerr cell shutter 18 may be placed intermediate photomultiplier 19 and surface 17 so as to reduce the amount of scattered light produced by the illuminating pulses. Photomultiplier 19 may be connected to an oscilloscope or other display means in order to monitor the radiation from the ruby crystal sample. A typical display of that radiation monitored at the output of photomultiplier 19 is shown in FIG. 2. The first pulse 30 corresponds to the high-intensity incident pulse 22 illuminating ruby sample 15 and is caused by a portion of its illumination passing through the aperture of surface 17 to register at the input of photomultiplier 19. A portion of the reflected pulse 23 constituting the second high-intensity illuminating pulse striking ruby sample 15 also passes through the aperture of surface 17 and strikes the input of the photomultiplier 19 to produce the pulse 31 delayed in time by an amount $\tau$ substantially equal to the delay time of the optical delay line 11. Subsequent to the illumination of the second pulse upon ruby sample 15, echo pulse 24 is produced and registered by photomultiplier 19 as pulse 32, delayed in time by an amount $2\tau$ with respect to the first-illuminating pulse 30. The relative magnitude of the illuminating pulses and the echo pulse as shown in FIG. 2 do not correspond to the relative magnitudes of the actual pulses produced since most of the energy of the illuminating pulses has been blocked by surface 17 and Kerr cell 18 to prevent saturation of the photomultiplier 19, whereas substantially all of the echo pulse 24 is permitted to pass through the aperture of surface 17 and register on photomultiplier 19.

It has also been observed that by suitably polarizing the illuminating light beams so that the first light beam is polarized with respect to the second light beam by an angle of $\theta$, that the polarization of the echo 24 produced by ruby sample 15 is rotated in angle from the incident illuminating pulse 22 by an angle of $2\theta$.

While the embodiment of the invention as described with respect to FIG. 1 indicates the provision of an angular displacement between the first and second light pulses, it is pointed that this angular displacement is not necessary for the production of the photon echoes, but in simplified form of the invention facilitates the separation of the emitted pulse from the first and second pulses. Thus, when the first two pulses are directed along the same axis, their intensity may be so high with respect to the emitted pulse that the emitted pulse may not be readily detected. Such a system, in general, requires the use of means such as a shutter, for minimizing the effect of the first two pulses on the detector. Experiments have shown the production of a photon echo pulse when the first and second pulses are transmitted to the material in the same direction.

While the echo generating apparatus has been described employing a ruby sample for producing the photon echo it is possible to employ any type of crystal, liquid, gas or semiconductor, which is capable of absorbing and storing the energy of the illuminating pulses. As is well known from the similar (but not identical) technique of spin echoes (see, for example, "Spin Echoes," E. L. Hahn, Physical Review Volume 80, 1950, pages 580 et seq.; "Effects of Diffusion on Free Precession in Nuclear Magnetic Resonants Experiments," H. Y. Carr and E. M. Purcell, Physical Review, Volume 94, 1954, pages 630 et seq.; "Electron Spin Relaxation Times in Sodium-Ammonia Solutions," R. J. Blume, Physical Review, Volume 109, 1958, pages 1867 et seq.); the important condition to be fulfilled in selecting the material for a spin-echo experiment is that one be able to supply two-resonant pulses to the medium in a time sufficiently small so that the echo is not lost due to homogeneous relaxation processes. This criteria has also been found to be true in the case of photon echoes, so that any material can be used as long as the homogeneous relaxation process is sufficiently long as compared to the time of separation of the pulses. This criterion can be met by any atomic or molecular levels that are capable of absorbing and storing the energy of the illuminating pulses, provided the pulse separation is sufficiently short.

In the case of spin echoes, the principle cause of this homogeneous relaxation is spin-spin interaction between neighboring spins. This mechanism can be operative in photon echoes if either or both of the atomic states involved in the absorption process have a magnetic spin which can interact with neighboring spins. It has been shown that this is one cause of relaxation of photon echoes in ruby and that this relaxation can be inhibited by applying a magnetic field to the sample (Columbia Radiation Laboratory Quarterly Progress Report No. 9, Mar. 15, 1965, pages 52 et seq.). The effect of these spin-spin interactions is to cause the frequency $f = \Delta E/h$ of the atomic transition to vary with time in a random way in different atoms. The dipole moments of the various atoms will, therefore, not be in phase at $t$ equals $2\tau$ since the net phase for atom $i$, $$\Delta \Phi_i = \int_0^\tau 2\pi f_i(t)\, dt - \int_\pi^{2\pi} 2\pi f_i(t)\, dt$$

will not in general be zero, as it would for $f_i =$ constant. In order to observe the echo, one must either inhibit this relaxation process or make the pulse separation, $\tau$, so small that $\Delta \Phi_i$ is not appreciably different from zero. Thus in ruby it has been found that as the pulse separation is decreased, echoes, are observed at smaller values of field. For example, at 36 nanoseconds pulse separation, a field of only 7 Gauss was found necessary to observe photon echoes. If the experiment is performed on a sufficiently short time scale, no magnetic field is required. In materials having spin interactions which are smaller or absent, echoes can be observed for a correspondingly longer time in zero field.

Similarly, any other process which contributes to the homogeneous width of a line will result in a decay of the echo amplitude. In gases and liquids, collision between molecules is a major source of broadening. Obviously, if a photon echo experiment is done in a time short compared to the average time between collisions, these collisions will not be effective in relaxing the echo. This can be achieved in a gas, for example, by going to sufficiently low pressures. In the case of a solid, it is not collisions with individual molecules which produces the broadening, but interactions with crystal vibrations, or phonons. In ruby it is known ("Linewidth and Temperature Shift of the R Lines in Ruby," D. E. McCumber and M. D. Sturge, Journal of Applied Physics, Volume 34, 1963, pp. 1682 ff.) that at temperature above $-77°$ K. the excited $\overline{E}(^2E)$ level utilized in these experiments is homogeneously broadened by a Raman phonon process, in which a phonon can be thought of as being scattered by the excited atom, and that at lower temperatures the dominant broadening process is a direct absorption of a phonon with energy equal to the separation between the $\overline{E}(^2E)$ level and the $2\overline{A}(^2E)$ level which lies next above it. Both types of processes are inhibited by cooling the crystal since the number of phonons in the crystal becomes very small when the temperature of the crystal is sufficiently lowered. Thus, lowering the temperature of the sample allows one to observe photon echoes for larger values of the pulse separation. It is possible, however, to observe photon echoes at elevated temperatures, e.g., room temperature, by producing excitation pulses whose duration and separation are not long compared to the inverse of the homogeneous frequency breadth of the absorption line. In ruby at 77° K., the data of McCumber and Sturge indicates that a photon echo experiment must be performed in less than $10^{-9}$ seconds. Lowering the temperature to 4.2° K. increases the permissible time scale by several orders of magnitude.

In general, in the case of solids, the technique of cooling the sample is useful in extending the echo lifetime whenever the principal source of broadening is the absorption or scattering of a phonon. If the broadening is caused by the emission of a phonon, the lifetime of the level involved approaches some limiting value at low temperature, given by the inverse of the spontaneous emission rate. Once one is below the temperature at which the stimulated and spontaneous phonon emission rates become comparable, further cooling of the sample would result in only a small change in the echo lifetime. In such cases, one would have to perform an echo experiment in a time not large compared to the spontaneous emission lifetime.

Moreover, suitable light sources other than lasers may be used for providing the illuminating pulses provided they are matched to the absorption spectrum of the sample. It is also conceivable that the source of radiation be not confined to light but may also include radiation whose wavelengths are in the ultraviolet or infrared regions. Here too, the frequency of the radiation must match the frequency absorption spectrum of the sample. In the embodiment employed with reference to FIG. 1, illuminating pulses having a wavelength of 6,935 A. were employed with pulse separations, of 80, 110 and 140 nanoseconds. These produced echo pulses delayed in time with respect to the first-illuminating pulse by an amount approximately equal to twice the pulse separation time for each of the three cases. It was also found that a magnetic field of greater than 50 Gauss applied to the ruby sample along the optic axis was necessary for the production of the echo pulses. During most of the experiments, the magnetic field applied to the ruby sample was approximately 250 Gauss. No echo was obtained when the magnetic field was reduced to zero. The optical axis of the sample ruby crystal 15, employed in the echo generator, was approximately 15° to the normal of the surface of the crystal. It was also found that no echo pulses were produced when the ruby sample was permitted to warm up by allowing the liquid helium to boil off. Tests were performed on the echo generating apparatus to confirm that the echoes produced were actually generated by the ruby sample in response to the illuminating pulses and not within the photomultiplier tube or from reflections within the generating apparatus.

As stated previously, the arrangement according to the invention can be employed as a memory element in a computer. In the basic form of the invention as illustrated in FIG. 1, desired information may be stored in the sample by a pulse from the laser 10. The information can be read out at a later time by means of the interrogation pulse from device 11, the delay of the output being determined by the delay of device 11. In addition, the arrangement may be employed as a logic element. For example, the device serves an "AND" function since the output is dependent upon the pulse from the laser and the device 11. In such an application, the device 11 may be controlled to selectively pass or block the delayed light. This arrangement can obviously be expanded to provide a plurality of devices 11 arranged to project light to the same sample at different angles and/or at different polarizations with respect to the laser beam, with correspondingly placed and/or polarized detectors, in order to multiply the logical functions provided by the device. It is thus apparent that the device may be arranged in many other manners to serve logical and arithmetic functions for a computer.

Such applications are well known in the spin-echo art, as evidenced by the following U.S. Pat. Nos. of Anderson et. al.: 2,714,714; 2,718,629; 2,759,170. Photon echo devices are employable as computer elements in much the same manner as spin-echo devices, but have the added advantages of higher speed and directional and polarization dependence.

While only a single embodiment of the present invention has been shown and described, it will be understood that many changes and modifications may be made therein without departing from the spirit of the invention as described by the appended claims.

What is claimed is:

1. The method of generating photon echo pulses comprising the steps of placing at a suitable temperature a radiation absorbing and light-emitting medium, illuminating said medium with a first high-intensity radiation pulse whose frequency overlaps part of the absorption spectrum of the medium; and illuminating the same area of said medium with a second high-intensity radiation pulse of substantially the same frequency and delayed a predetermined amount of time from said first illuminating pulse, whereby said medium generates a photon echo pulse responsive to said first and second pulses at a time after said first pulse substantially equal to twice the time separation of said first and second pulses and at a frequency substantially equal to the frequency of the exciting pulses, said pulses being in the range of light frequencies, said temperature being a temperature at which the relaxation times of said medium are not short compared to the times separation of said first and second pulses.

2. Apparatus for the generation of photon echo pulses comprising:
    means for producing a high-intensity light pulse;
    means for splitting said high-intensity light pulse into first- and second-illuminating pulses, a delay line for receiving and delaying said second pulse with respect to said first pulse by a predetermined delay;
    a ruby crystal sample having a temperature at which the relaxation times of said sample are not short compared to the time separation of said first- and second-illuminating pulses; said first- and second-illuminating pulses having a frequency which overlaps part of the absorption spectrum of said sample;
    means for directing said first-illuminating pulse and said second-illuminating pulse delayed in time with respect to said first pulse onto substantially the same area of the surface of said ruby, and
    means for collecting and recording a portion of said first- and second-illuminating pulses and said echo pulse whereby the angular displacement of said echo pulse with respect to said first-illuminating pulse emerging from said ruby is equal to twice the angular displacement between said first- and second-illuminating pulses.

3. A high-speed memory storage unit for use in a computer comprising:
    a light-absorbing medium;
    a first light pulse directed at said medium and responsive to the information to be stored in the computer;
    a second high-energy pulse directed at the same area of said medium and responsive to the interrogation pulse produced by said computer, said first and second pulses having frequencies that overlap the absorption spectrum of said medium, said medium having a temperature whereby the relaxation time of said medium are not short compared to the time separation of said first and second pulses; and
    means assisting said medium to produce an echo pulse responsive to the information stored within said medium.

4. The memory unit as recited in claim 3, wherein the information stored in said unit comprises the time difference between said echo pulse and said first pulse and equal to twice the time difference between said first pulse and said second pulse.

5. A memory unit as recited in claim 3, wherein the information stored within said computer memory unit is derived from the direction of said echo pulse produced by said medium relative to said first pulse and equal to twice the angular difference between said first and second pulses directed at said medium.

6. The memory unit as recited in claim 3, wherein said information stored is derived from the angle of polarization of said echo pulse produced by said medium with respect to said first pulse and equal to twice the difference between the angular polarizations of said first and second pulses.

7. A method as recited in claim 1 comprising the steps of angularly displacing the illumination of said first pulse, and detecting the echo pulse at an angle with respect to said first pulse substantially equal to twice the angle between said second pulse and said first pulse.

8. A method according to claim 1 further comprising the step of applying a magnetic field to said medium in a direction substantially parallel to its optical axis.

9. An apparatus for the generation of photon echo pulses comprising:
 a radiation absorbing and light-emitting medium;
 a first means for illuminating said medium by a first high-intensity pulse of radiation having a frequency that overlaps part of the absorption spectrum of said medium; a second means for illuminating substantially the same area of said medium by a second high-intensity pulse of radiation of substantially the same frequency and delayed in time with respect to said first-illuminating pulse to excite a photon echo pulse in said medium, said medium having a temperature whereby the relaxation times of said medium are not short compared to the times separation of said first and second pulses.

10. The apparatus for the generation of photon echo pulse comprising:
 a ruby medium;
 A Q-switched ruby laser for illuminating said ruby medium with a first light pulse having a frequency that overlaps the absorption spectrum of said ruby medium;
 a light delay system optically coupled with said first light pulse for producing a delayed second light pulse from said first light pulse to illuminate substantially the same area of said ruby medium; and
 means for applying a magnetic field to said ruby medium substantially parallel to the optical axis thereof to assist said ruby medium to produce a photon echo pulse.

11. The apparatus as recited in claim 10 comprising optical means for angularly displacing said second light pulse with respect to said first light pulse.

12. The apparatus as recited in claim 10 comprising means for blocking at least a part of said first and second light pulses transmitted through said ruby.

13. The apparatus as recited in claim 10, comprising means for cooling said ruby to said temperature.

* * * * *